United States Patent Office 2,876,870
Patented Mar. 10, 1959

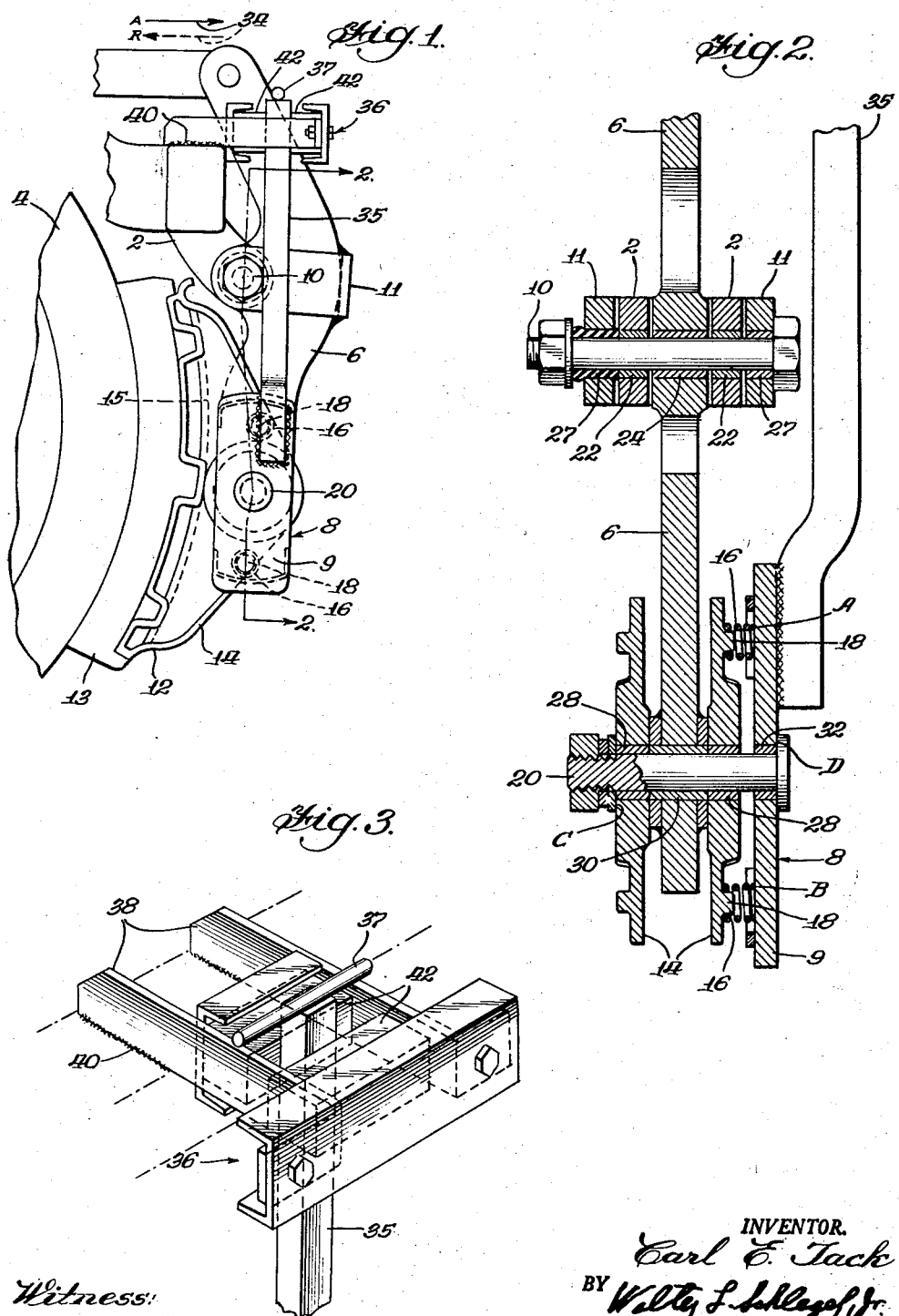

2,876,870

BRAKE HEAD BALANCING DEVICE

Carl E. Tack, Chicago, Ill., assignor to American Steel Foundries, Chicago, Ill., a corporation of New Jersey Application July 26, 1956, Serial No. 600,272

7 Claims. (Cl. 188—206)

My invention pertains to the beamless type of brake rigging for railway cars and is particularly concerned with a novel mechanism for applying a braking force to the car wheel and automatically maintaining the brake head in desired positions relative to the wheel; such mechanism is commonly known as a brake head balancing device.

An object of my invention contemplates the provision of friction means capable of automatically maintaining the brake head in an upright spaced relation relative to the wheel, while the brake is disengaged to prevent the shoe from dragging or binding on the wheel, while also enabling the brake head to adjust itself relative to the wheel to compensate for wearing away of metal at the braking surfaces.

Another object is to provide an arrangement for preventing dragging or binding of the brake shoe on the wheel in a case where the hanger lever for the brake head is pivoted at a point close to the tread of the wheel, for reasons of efficiency in construction, and in which because of such close proximity, such binding may otherwise occur.

Another and specific object is to provide a brake head balancing device including a hanger lever and balance hanger effectively swingable about axes that are eccentric relative to each other.

A further object is to provide an arrangement of the nature referred to immediately above in which novel means is included for enabling sliding movement of the balance hanger to accommodate the guiding movements thereof.

Another object is to provide safety means for preventing dropping out of the balance hanger in the event its connections with operating parts should for any reason become impaired.

Other objects and advantages of the invention will appear from the following description taken in conjunction with the accompanying drawings, in which:

Figure 1 is a side elevational view of a brake balancing device embodying my invention;

Figure 2 is an enlarged sectional view taken on line 2—2 of Figure 1, and

Figure 3 is a partial perspective view of the mounting for the balance hanger.

Describing my invention in detail and with reference to the drawings illustrating the mechanism in the engaged position, numeral 2 indicates a hanger lever bracket secured to a railway car truck (not shown) in which an axle (not shown) carrying a wheel 4 is journaled. Hanger lever 6 may be pivotally supported by a pin or bolt and nut assembly 10 secured to the bracket 2, the latter having spaced elements embracing the lever 6. A U-shaped clip 11 is welded to the hanger lever 6 and has its arms straddling the elements of the bracket 2 and apertured for receiving the bolt of the bolt and nut assembly 10. The clip improves the bearing area and stability of the hanger lever. Brake head 12 is provided with an opening defined by spaced walls 14—14 and front wall 15 for the reception of hanger lever 6 and for the positive limitation of rotation of brake head 12 relative to hanger lever 6. Brake shoe 13 is secured to brake head 12 for movement therewith.

A hanger lever and brake head of the character herein shown, and described above, are also shown and described in my copending applications, Serial No. 241,829, filed August 14, 1951, now Patent No. 2,768,713, and Serial No. 584,967, filed May 15, 1956, now Patent No. 2,815,102. In each of those two applications mentioned, a balance hanger is incorporated in the assembly and cooperates with the hanger lever 6 in control and operation of the brake head. In the present instance, the balance hanger 8 of novel construction constitutes an essential part of the invention and will be described in detail hereinbelow. However, in addition to its novel features, it also cooperates with the hanger lever 6 in control of the brake head by friction means, as in the above mentioned applications. The latter control is brought about through friction engagement between the balance hanger and the brake head. The balance hanger in the present instance, designated as 8, includes a plate portion 9 spaced from the hanger lever 6 in the direction of the axis of the pin 10 and extends downwardly to the lower end of the hanger lever. Helical springs 16—16 sleeved around lugs 18—18 are interposed between wall 14 and balance hanger 8, the springs being seated in flat face abutment. Hanger lever 6, balance hanger 8, brake head 12 and springs 16—16 are secured in assembled relation by a bolt and nut assembly 20. This arrangement affords spaced supporting bearings for the bolt of bolt and nut assembly 20, retains springs 16—16 in a compressed or loaded condition, and affords pivotal movement of brake head 12 relative to its axis against the frictional resistance developed at A, B, C and D, as hereinafter more fully described. Bushings affording better wearing surfaces are provided in every pivotal connection as at 22, 22, 24, 27, 27, 28, 28, 30 and 32. The bushing 27 at one end, e. g., adjacent the nut on the bolt and nut assembly, may be rubber, as shown, to take up play.

The operation or function of the assembly from the standpoint of friction control of the brake head, as mentioned above, is as follows:

The forces exerted by compressed springs 16—16 cause the members to firmly frictionally engage each other at A, B, C and D to maintain brake head 12 in a substantially upright position while the brake is disengaged; as a result of any turning moment exerted on the brake head the flat ends of springs 16—16 will tend to slide on balance hanger 8 at A and B, the brake head will tend to slide on the washer at C, and the bolt head will tend to slide on the balance hanger at D. This sliding is resisted or checked by the frictional moments automatically developed at A, B, C and D. Consequently, the brake head will normally not rotate under the influence of its weight, vibrations and impacts but will remain in an upright position to readily facilitate braking. The forces exerted by compressed springs 16—16 on the brake balancing device act to prevent rattling and damaging vibrations.

The brake is applied and released by appropriate forces at the upper end of the brake lever in Figure 1 as per arrows 34, the full line arrow indicating direction of application, and the dotted line arrow the direction of release. The hanger lever is pivoted about the pin 10 as noted above, and it will be noted that this pin is so located that a line drawn between the axis thereof and the axis of the wheel 4 (Figure 1) is below the upper end of the brake shoe. Hence, were it not for the provision to prevent it, the upper end of the brake shoe would bind on the wheel tread surface in applying and releasing the brake. If the brake shoe remained fixed relative to the hanger lever, such binding effect would take place in the swinging movements of the lever. However, this binding effect is prevented by the novel balance hanger of the invention.

The balance hanger 8 is pivotally mounted on the bolt 20 and has an arm 35 extending upwardly to and through the bracket assembly 36. This assembly includes suitable frame members 38 (Figure 3) secured to the truck at a suitable location such as 40 and has a pair of spaced resilient pieces or blocks 42 therein. These resilient pieces are preferably of rubber or rubber-like composition having the desired resilience characteristics. The hanger lever extends between these rubber blocks and is quite tightly gripped thereby. A cross piece 37 is secured to the upper end of the balance hanger as a safety measure to prevent the balance hanger from dropping out of its connections to other elements should the connections thereto for any reason be disabled.

The operation of the balance hanger in preventing binding of the brake shoe with the wheel is as follows:

For convenience, the description of the operation of the device will be given in connection with release of the brake. In this operation, the hanger lever 6 is rotated counterclockwise (Figure 1). A tendency exists for the balance hanger to be moved in the same direction, namely, rotated counterclockwise. In such movement, the upper end of the balance hanger would move to the left (Figure 1), but it is prevented from so doing by the bracket assembly 36. The net result is that the balance hanger, relative to the hanger lever, swings clockwise, and since the brake shoe is mounted to the balance hanger for rotating therewith about the axis of the bolt 20, as explained in the above applications, it will itself move or rotate clockwise, at least relatively speaking. Hence, as the hanger lever moves the brake head away from the wheel, the relative clockwise movement of the brake head results in the brake shoe remaining approximately parallel with the wheel tread.

The distance between the pivot axis of the bolt 20 and the effective connection between the balance hanger and the bracket 36 should be greater than the distance between the pivot axis of the brake lever 6, at 10, and the axis at 20. The greater this difference in distance, the greater will be the clearance of the brake shoe relative to the wheel tread and hence as a practical matter that connection is placed at a relatively great height.

The resiliency afforded by the rubber blocks 42 accommodates inaccuracy in the parts and results in smoother and more resilient action. The relatively great gripping action by the rubber blocks prevents the balance hanger from unduly shifting about. The connection between the balance hanger and the rubber blocks may be considered as a pivotal connection in that the balance hanger swings about the blocks as a fulcrum. This connection also permits longitudinal sliding movement of the balance hanger to accommodate the movements of the brake head made necessary by the difference in effective lengths of the balance hanger and hanger lever.

I claim:

1. A brake head balancing device for a railway car truck comprising a hanger lever pivotally connected to said truck, a brake head pivotally mounted on said lever, and a balance hanger connected to said brake head and to said truck at a point on the latter eccentric to the pivot axis of the hanger lever, said balance hanger being permitted limited lateral and longitudinal movement relative to the truck, said point being spaced from the connection point between the balance hanger and brake head a distance greater than the distance between the pivot axis of the hanger lever and the connection between the latter and brake head.

2. A brake head balancing device for a railway car truck comprising a hanger lever pivotally connected to said truck, a brake head pivotally mounted on said lever, a balance hanger connected to said brake head, a connection between said balance hanger and the truck for allowing said balance hanger to move longitudinally and laterally relative to the truck, the connection between the hanger and the truck being located at a point on the latter eccentric to the pivot axis of the hanger lever, and a frictional connection between the balance hanger and brake head.

3. A brake head balancing device for a railway car truck comprising a hanger lever pivotally connected to said truck, a brake head and a pin pivotally connecting it to said hanger lever, a balance hanger pivotally connected to said pin, friction means interposed between said brake head and balance hanger, and a connection between said balance hanger and truck for allowing said balance hanger to move laterally and longitudinally relative to the truck.

4. A brake head balancing device for a railway car truck comprising a brake head, a hanger lever, means to fulcrum said hanger lever, a balance hanger, means pivotally connecting said brake head to said hanger lever and to said balance hanger, a frictional connection between the balance hanger and the brake head operable to resist relative pivotal movement therebetween, and a connection between said balance hanger and the truck spaced from said fulcrum means for allowing said balance hanger to move longitudinally and laterally relative to the truck.

5. A brake head balance device according to claim 4, wherein the connection between the balance hanger and the truck includes resilient means on the latter defining an opening within which the former is snugly received.

6. A brake head balancing device for a railway car truck comprising a brake head, a hanger lever, means to fulcrum said hanger lever, a balance hanger, means pivotally connecting said brake head to said hanger lever and to said balance hanger, a frictional connection between the balance hanger and the brake head operable to resist relative pivotal movement therebetween, and a connection between said balance hanger and the truck spaced from said fulcrum means, the connection between the balance hanger and the truck including resilient means frictionally gripping said balance hanger.

7. A brake head balancing device for a railway car truck comprising a brake head, a hanger lever, means to fulcrum said hanger lever, a balance hanger, means pivotally connecting said brake head to said hanger lever and to said balance hanger, a frictional connection between the balance hanger and the brake head operable to resist relative pivotal movement therebetween, and a connection between said balance hanger and the truck spaced from said fulcrum means, the connection between the balance hanger and the truck including a cross piece secured on said balance hanger and a bracket on the truck engageable with said cross piece and operable as stop means for said cross piece.

References Cited in the file of this patent

UNITED STATES PATENTS 2,043,693    Baselt    June 9, 1936